Patented Nov. 30, 1926.

1,608,832

UNITED STATES PATENT OFFICE.

CLARENCE BIRDSEYE, OF GLOUCESTER, MASSACHUSETTS.

METHOD IN PREPARING FOODS AND THE PRODUCT OBTAINED THEREBY.

No Drawing.   Application filed August 24, 1925. Serial No. 52,213.   REISSUED

This invention relates to an improved method of preparing foods and the product obtained thereby, and more particularly relates to preparation of fish and to the fish product thus obtained.

The objects of the invention are to provide an improved method of preparation of food products which will render the same more readily handled without damage, and more permanent in form when sliced, cooked or otherwise treated after purchase and in preparation for eating; to enable scraps and other edible portions of the food to be made salable and attractive as well as convenient to handle, cook and use; to particularly adapt the invention to recovery and use of edible portions of otherwise wasted fish; to avoid cooking or other expensive operations during manufacture; to obtain a homogeneous mass; to utilize inherent properties of the food in carrying out the process and thus avoid inclusion of foreign matter; to provide a product which will resist disintegration even more positively than usual fish fillets while being cooked; to avoid the necessity of heavily salting the fish in preparing the product; to avoid the necessity of tying, boxing and other artificial means for maintaining the shape of the food product; to secure simplicity and lower cost of construction and process of manufacture; and to obtain other advantages and results as may be brought out in the following description.

As one specific embodiment of the invention as applied to fish, I preferably employ the flesh of properly cleaned, fresh fish. I wish to clearly distinguish at this time between "fresh" fish and "salt", "cured" or "pickled" fish; these terms having a very definite meaning in the fish industry. "Salt" fish are not only so heavily salted that they require to be freshened before use, but they are at least partially dried, both of which characteristics distinguish such fish from "fresh" fish which are preserved in their natural state as near as possible. In the case of "salt", "cured" or "pickled" fish the preservative effect of salt is largely depended upon to prevent spoilage; while any product to be truly "fresh" and not "salted" relies upon the same preservative methods as are or can be applied to the proper handling of unprepared or fresh fish. One such method of preservation of fresh fish is by subjecting the same to low temperatures, and this method is preferably the one adopted in connection with the fish prepared according to my invention.

The fish used are preferably taken as fresh from the water as possible, for the usual reasons, and the edible portions thereof utilized in whole or in part in carrying out the invention. It may be noted that the invention enables use of edible scraps of fish, such as would be ordinarily wasted in cutting fillets from the bone, and accordingly the invention may be employed to use only those scraps or to employ the entire edible portion of the fish if so desired. Also, let it be stated here that the fish are kept as cold as conveniently possible throughout the process, but I do not mean that the process has to be carried out in a refrigerated room. The fish taken from the water, or from the boats or elsewhere in iced condition for preservation, are quite cold, and the process of cleaning and removing the flesh and carrying through the steps of my improved process is accomplished in a sufficiently short time and without any intentional application of heat, so that the fish will be at all times quite cold.

Such part of the fish as is to be utilized in connection with my process, for instance the meat or flesh which adheres to the bone in cutting off the fillets, is removed from the unedible portions and where necessary or desired are preferably reduced to fragments of suitable size and in suitable manner. By fragments, it is to be understood that I refer to any disintegration of the fish from quite large pieces down to actual granulation. I have found that very good results are obtained by passing portions of fish through a grinder, this means apparently rupturing the cells of the fish very effectively, and obtaining very small fragments, but, as indicated above, the fragments may be left or made of any size desired. This reduced fish flesh, which will be referred to as pulp for convenience, is then placed in suitable molds of any desired size or shape and with or without puddling or slight pressure and is left for a sufficient time to become united as a homogeneous mass.

I have found that best results seem to be obtained by slightly puddling the reduced fish or pulp after it is put in the mold. By this I mean applying a motion to the mass similar to that employed in surfacing concrete. This operation seems to work the fragments of fish together and obtain better cohesive effect from the protoplasm or other glue content. However, it may be noted that the same results are obtained by a direct pressure of proper intensity which may be used with or without the "puddling" motion. While slight or no pressure whatever, gives good results, it may be noted that increased pressure does not adversely affect the product, and may be used for the beneficial effect thereof.

It appears that the fish contains a natural gluey material, sufficient under proper conditions, to cause one portion of fish to adhere to another, and with the reduction of the fish as suggested above by a grinder to obtain a pulp, the adhesion of the various particles thereafter amounts to a solidification of the mass in a firm homogeneous cake. A similar cohesive effect is evident when larger pieces are brought together, and I do not wish to limit myself to any particular degree of fineness in preparing the fragments or particles of fish for cohesion. Sufficient time is allowed after the pulp has been puddled or otherwise treated in the mold, for it to "set" or solidify; for instance twelve hours has been employed with good results, the products then being ready for use. While the pulp is thus "setting" or solidifying, it is preferable that it be kept cold, and, in fact, it may even be frozen before or after "setting", intense cold during the "setting" period apparently not being injurious. Where the product is to be kept for some time after manufacture, it is preferable to actually freeze the same, utilizing intense cold for a short period so as to freeze the product very quickly and thus large preserve the taste and other desirable characteristics of fresh fish. It may then be shipped in suitable heat insulated containers or otherwise, or stored in suitable refrigerators or cold storage rooms.

I wish to call attention to the fact that although the protoplasm and perhaps some of the other constituents of fish flesh have certain "gluey" qualities, they are not actually what is generally termed "glue" until they have been subjected to heat, and my process introduces no heat. Therefore, I here use the word "glue" in a general sense to indicate all the adhesive elements of the fish flesh, but more particularly the protoplasm. In this connection it may be well to emphasize that the fish employed is that known as fresh fish and that every endeavor is made to keep the same chilled from the start to finish, both to retard decomposition and for beneficial effects on the finished product which appears to be improved by being manufactured when cold. It may also be here mentioned that a somewhat better adhesion of the component particles of the finished cake seems to be obtained by using a small amount of salt. This however, does not approach the amount used in "curing" fish, and may be even less than the amount ordinarily added in cooking fresh fish. The effect of the salt is to contract the cell walls and thus express some of the protoplasm from the individual cells and to leave it free to cause adhesion when the various fragments or particles are brought together in the cake or mold. This salt may be added to the product either by immersing in pickle the pieces of fish before they are pulverized, by adding dry salt to the ground mixture or by salting heavily the juice or other liquid which I add to the pulverized fish. As one manner of carrying out the salting of the fish, it may be immersed for perhaps one minute in a sixty percent saturated brine. Such an immersion would have no practical effect if the fish were to be salted or cured in the ordinary sense, as for that purpose the fish must be struck through with salt— a process which would require immersion in a saturated solution of brine for from 12 to 48 hours or more.

Heretofore, fish in the fresh state has been cleaned, cut into fillets, and frozen, but the fillets have a tendency to break or crumble in handling, particularly while or after being cooked. By the present invention, the cakes of the prepared product are sufficiently tenacious so as to retain their shape and not disintegrate while being sliced, fried, boiled, broiled or otherwise prepared for eating, and yet the fish when thus prepared and eaten tastes like and is as tender as the original fish would taste.

Particular attention is directed to the fact that the taste and texture is largely due to the fact that the fish is not dried out, but all the moisture is retained. In fact, additional moisture may be supplied in some instances or in every case if found desirable, such moisture being the fish juices and oils obtained from the same or other fish, as for instance from the heads, or may be in the form of clear water or brine. Likewise, it is within the scope of the invention to mix the fish flesh, roes and other edible portions with or without the juices and oils, or with other ingredients added, and to mix edible parts of the various kinds of fish, however diverse, so as to produce various desired flavors, textures, food values and so forth, the mixture at all times being fresh raw fish until cooked by the purchaser. The high moisture content is one of the advantages of the product, and clearly distinguishes it from salt or cured fish, in which every effort is usually made to expel or evaporate the natural juices or moisture of the fish. It may also be added that the moisture which may be added to the product as indicated above, may be sterilized so as to aid in the preservation of the product. However, the product with or without the added moisture may be sterilized at any stage of manufacture, using an antiseptic if desired. Furthermore, it is to be understood that I refer in the foregoing description and following claims to "fish" in a general sense, including thereby all sea-products including clams, oysters, crabs, lobsters, and so forth, in addition to fish according to the usual conception of that term.

Obviously detail changes and modifications may be made in the method and product of my improved invention without departing from the spirit or scope thereof, and I do not wish to be understood as limiting myself to the precise operations mentioned or to the exact product described in detail in the foregoing specification except as set forth in the following claims when construed in the light of the prior art.

Having thus described the invention, I claim:—

1. A process of preparing fish consisting in reducing fresh fish to fragments, and solidifying the mass of fragments having in the solidified mass substantially not less moisture than that contained in the fish from which the fragments were prepared.

2. A process of preparing fish consisting in reducing fresh fish to fragments thereby rupturing cells of the fish flesh and uniting said fish flesh in a solidified homogeneous mass by the gluey content of the opened cells.

3. A process of preparing fish consisting of reducing fresh fish to fragments thereby rupturing cells of the fish flesh and uniting said fish flesh in a solidified homogeneous mass by the gluey content of the opened cells, and freezing said fish.

4. A process of preparing fish consisting in reducing fresh fish to fragments thereby rupturing cells of the fish flesh and uniting said fish flesh in a solidified homogeneous mass by the gluey content of the opened cells, forming said mass into a cake, and freezing said cake.

5. A food product consisting of a homogeneous solidified mass of fresh raw fish having not less moisture than that contained in the fish from which the fragments were prepared.

6. A food product consisting of a solidified mass of fragments from different kinds of fresh raw fish assembled and held together as a tenacious cake with substantially not less moisture retained than that contained in the fish from which the fragments were prepared.

CLARENCE BIRDSEYE.